United States Patent [19]
Prasad et al.

[11] Patent Number: 5,851,266
[45] Date of Patent: Dec. 22, 1998

[54] HYBRID SOLID ELECTROLYTE IONIC CONDUCTOR SYSTEMS FOR PURIFYING INERT GASES

[75] Inventors: Ravi Prasad, East Amherst; Christian Friedrich Gottzmann, Clarence, both of N.Y.

[73] Assignee: Praxair Technology,Inc., Danbury, Conn.

[21] Appl. No.: 880,879

[22] Filed: Jun. 23, 1997

[51] Int. Cl.$^6$ ............................................. B01D 53/22
[52] U.S. Cl. ......................... 95/54; 95/51; 95/52; 95/96
[58] Field of Search .................... 95/45, 51, 52, 95/54, 96, 106, 115; 96/4, 9, 108, 130, 143

[56] References Cited

U.S. PATENT DOCUMENTS

| | | | |
|---|---|---|---|
| Re. 34,595 | 5/1994 | Chen et al. | 95/54 |
| 3,925,041 | 12/1975 | Patterson et al. | 55/267 |
| 4,718,921 | 1/1988 | Makino et al. | 95/52 |
| 4,931,970 | 6/1990 | Prasad | 55/16 |
| 5,004,482 | 4/1991 | Haas et al. | 55/16 |
| 5,084,073 | 1/1992 | Prasad | 55/16 |
| 5,102,432 | 4/1992 | Prasad | 55/16 |
| 5,116,396 | 5/1992 | Prasad et al. | 62/24 |
| 5,156,657 | 10/1992 | Jain et al. | 55/26 |
| 5,160,713 | 11/1992 | Mazanec et al. | 423/210 |
| 5,185,014 | 2/1993 | Prasad | 55/16 |
| 5,205,842 | 4/1993 | Prasad | 55/16 |
| 5,226,932 | 7/1993 | Prasad | 95/45 |
| 5,240,472 | 8/1993 | Sircar | 95/52 |
| 5,259,869 | 11/1993 | Auvil et al. | 95/52 |
| 5,281,253 | 1/1994 | Thompson | 95/45 X |
| 5,306,411 | 4/1994 | Mazanec et al. | 204/265 |
| 5,332,424 | 7/1994 | Rao et al. | 95/51 X |
| 5,378,263 | 1/1995 | Prasad | 95/54 |
| 5,383,956 | 1/1995 | Prasad et al. | 95/45 |
| 5,425,801 | 6/1995 | Prasad | 95/45 X |
| 5,435,836 | 7/1995 | Anand et al. | 95/51 X |
| 5,447,555 | 9/1995 | Yee et al. | 96/9 X |
| 5,547,494 | 8/1996 | Prasad et al. | 95/54 |
| 5,557,951 | 9/1996 | Prasad et al. | 62/648 |
| 5,709,732 | 1/1998 | Prasad | 95/45 |
| 5,733,435 | 3/1998 | Prasad et al. | 96/4 X |

*Primary Examiner*—Robert Spitzer
*Attorney, Agent, or Firm*—Douglas E. Denninger

[57] ABSTRACT

A process for removing oxygen from a feed gas stream to produce an oxygen-depleted retentate gas stream by supplying the feed gas stream to a bulk oxygen separation system for removing oxygen to produce an oxygen-depleted crude product gas stream and a first oxygen-containing permeate effluent stream, and supplying the oxygen-depleted crude product gas stream to a separator having a primary ion transport membrane to produce a second permeate effluent stream and the oxygen-depleted retentate gas stream. A reactive purge gas is added to react with a portion of the oxygen permeating through the primary ion transport membrane and purge the permeate side of the primary ion transport membrane, and/or a recycle gas stream comprising at least a portion of one gas stream produced during the process is added to at least one other of the gas streams.

20 Claims, 11 Drawing Sheets

HYBRID SOLID ELECTROLYTE IONIC CONDUCTOR SYSTEMS FOR PURIFYING INERT GASES

FIELD OF THE INVENTION

The invention relates to an apparatus and process for separating oxygen from a mixed gas feed stream and, more particularly, to an apparatus and process utilizing both a bulk oxygen separation system and a solid electrolyte ionic conductor separator for separating oxygen from air to produce high purity nitrogen or other inert gas.

CROSS-REFERENCE

The application entitled "Solid Electrolyte Ionic Conductor Systems For The Production Of High Purity Nitrogen", U.S. Ser. No. 08/880,877[Attorney Docket No. D-20309] filed concurrently herewith, is incorporated herein by reference.

BACKGROUND OF THE INVENTION

For many years non-cryogenic bulk oxygen separation systems, for example, organic polymer membrane systems, have been used to separate selected gases from air and other gas mixtures. Composite hollow fibers which employ these organic polymer membranes may have separation factors that favor the permeation of oxygen over nitrogen by a factor of ten or less. Over the years, many processes employing such polymer membranes have been devised for the production of oxygen and particularly nitrogen from ambient air by taking advantage of this permeation differential. Systems utilizing polymer membranes to separate oxygen from nitrogen are described in, for example, Prasad, U.S. Pat. No. 5,378,263, entitled *High Purity Membrane Nitrogen*.

Other non-cryogenic bulk oxygen separation systems utilize pressure-swing adsorption (PSA) to separate selected gases. Polymer membrane dryers used as purifiers for PSA nitrogen production are described in, for example, Haas et al., U.S. Pat. No. 5,004,482, entitled *Production of Dry, High Purity Nitrogen*.

Air is a mixture of gases which may contain varying amounts of water vapor and, at sea level, has the following approximate composition by volume: oxygen (20.9%), nitrogen (78%), argon (0.94%), with the balance consisting of other trace gases. The presence of argon in a nitrogen product is not of concern for many applications of this gas and therefore it is often not removed from the nitrogen.

Polymeric membrane systems have long been used for the separation of nitrogen from air. Such membrane systems include the NitroGEN™ systems developed by Praxair, Inc., which are used for the commercial production of nitrogen from air. The purity of the nitrogen product depends on the number of permeation "stages" employed. For low purities, a single stage process suffices. Higher purity can be achieved in a two-stage process wherein the permeate from the second stage (which is nitrogen-rich compared to air) is recycled to the feed compressor. By adding a third stage, with recycle to the feed gas stream of the permeate streams from the second and third stages, a still higher purity can be achieved. The oxygen content in the product nitrogen can be reduced to approximately 0.5% by these means, but the required membrane area and the system power both become excessive when higher purities are specified.

When an oxygen-free product is specified, it is typical to utilize a hydrogen-based deoxygenation system (hereinafter a "conventional deoxo" system) to treat the retentate (product) from the membrane process. A quantity of pure hydrogen is added to the retentate stream which then passes through a catalyst that induces the hydrogen to react with the contained oxygen to produce water. A separate drying system is required to remove this water. It is obvious that an excess of hydrogen ($H_2 > 2O_2$) is required. This excess of hydrogen remains in the product nitrogen.

The combination of a polymeric membrane system with a conventional deoxo purifying system represents the current state of the art for producing high purity nitrogen in small to medium quantities.

An entirely different type of membrane, however, can be made from certain inorganic oxides. These solid electrolyte ion transport membranes are made from inorganic oxides, typified by calcium- or yttrium-stabilized zirconium and analogous oxides having a fluorite or perovskite structure. At elevated temperatures these materials contain mobile oxygen ion vacancies. When an electric field is applied across such an oxide membrane, the membrane will transport oxygen through the membrane in the form of oxide ions. Because these materials allow only oxygen permeation, they act as a membrane with an infinite selectivity for oxygen. These oxide ceramic membranes are thus very attractive for use in new air separation processes.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 500° C.–1100° C. range. This limitation remains despite much research to find materials that work well at lower temperatures.

There are now two types of solid electrolyte ion transport membranes in use: ionic conductors that conduct only oxygen ions through the membrane and mixed conductors that conduct both ions and electrons through the membrane. As used herein, the terms "solid electrolyte ionic conductor", "solid electrolyte ion transport membrane", "ion transport membrane" or simply "solid electrolyte" are used to designate either an ionic-type material or a mixed conductor-type material unless otherwise specified. Solid electrolyte ionic conductor technology is described in more detail in Prasad et al., U.S. Pat. No. 5,547,494, entitled *Staged Electrolyte Membrane*, which is hereby incorporated by reference to more fully describe the state of the art.

A solid electrolyte ion transport membrane exhibiting mixed conduction characteristics can transport oxygen when subjected to a differential partial pressure of oxygen across the membrane without the need for an applied electric field or external electrodes which would be necessary with the ionic conductors. In an ionic or mixed conduction inorganic oxide, oxygen transport occurs due to a presence of oxygen vacancies in the oxide. Oxygen ions annihilate oxygen ion vacancies which are highly mobile in the oxide. Electrons must be supplied (and removed at the other side of an oxide membrane) to make the reaction proceed. For materials that exhibit only ionic conductivity, electrodes must be applied to opposed surfaces of the oxide membrane and the electronic current is carried by an external circuit.

Prasad et al., U.S. Pat. No. 5,557,951, entitled *Process and Apparatus for Recovery of Argon from a Cryogenic Air Separation Unit*, discloses withdrawal of an argon-enriched liquid from a packed argon column, vaporizing the argon-enriched liquid to produce argon-enriched vapor, and contacting the argon-enriched vapor with a solid electrolyte ionic or mixed conductor membrane. Product grade argon is recovered having an oxygen concentration below about 10 ppm.

Chen et al., U.S. Pat. No. Re. 34,595 (reissue of U.S. Pat. No. 5,035,726), entitled *Process for Removing Oxygen and Nitrogen from Crude Argon*, relates to the use of electrically-driven solid electrolyte membranes for the removal of low levels of oxygen from crude argon gas streams. Chen et al. estimate the electrical power needed for several examples of multistage processes and also mention the possibility of using mixed conductor membranes operated by maintaining an oxygen pressure on the feed side. Chen et al. further teach that oxygen exiting from the permeate side of an electrically-driven ionic membrane may either be removed as a pure oxygen stream or mixed with a suitable "sweep" gas such as nitrogen.

Mazanec et al., U.S. Pat. No. 5,160,713 entitled *Process for Separating Oxygen from an Oxygen-Containing Gas by Using a Bi-Containing Mixed Metal Oxide Membrane*, relates to an oxygen separation process employing a bismuth-containing mixed metal oxide membrane which generally provides that the separated oxygen can be collected for recovery or reacted with an oxygen-consuming substance. The oxygen-depleted retentate is apparently discarded.

Mazanec et al., U.S. Pat. No. 5,306,411, entitled *Solid Multi-Component Membranes, Electrochemical Reactor Components, Electrochemical Reactors and Use of Membranes, Reactor Components, and Reactor for Oxidation Reactions*, relates to a number of uses of a solid electrolyte membrane in an electrochemical reactor. It is mentioned that nitrous oxides and sulfur oxides in flue or exhaust gases can be converted into nitrogen gas and elemental sulfur, respectively, and that a reactant gas such as light hydrocarbon gas can be mixed with an inert diluent gas which does not interfere with the desired reaction, although the reason for providing such a mixture is not stated. Neither of the Mazanec et al. patents cited disclose processes to produce a high purity product from an oxygen-containing stream.

OBJECTS OF THE INVENTION

It is therefore an object of the invention to provide an efficient process for making high purity nitrogen or other inert gas using a hybrid bulk oxygen separation system and an ion transport module with a purge gas stream to reduce power consumption.

It is also an object of the invention to provide an efficient process for making high purity nitrogen or other inert gas using a hybrid non-cryogenic bulk oxygen separation system and an ion transport module by recycling the purge waste stream from the ion transport module to reduce power consumption.

It is a further object of the invention to increase the efficiency of the hybrid processes by purging the permeate side of the ion transport membrane with a waste purge, a product purge, or a reactive purge.

It is yet another object of the invention to enhance the efficiency of the hybrid processes by using a multiple-stage polymer membrane separation system as the non-cryogenic bulk oxygen separation system.

It is yet a further object of the invention to enhance the efficiency of the hybrid processes by using multiple-stage ion transport membranes as oxygen separators.

It is still another object of the invention to enhance the efficiency of the hybrid processes by using a heat exchanger to couple the ambient temperature region of the polymeric membrane system with the high temperature region of the ion transport membrane system.

SUMMARY OF THE INVENTION

The invention comprises a process for removing oxygen from a feed gas stream containing elemental oxygen and at least one other gas to produce an oxygen-depleted retentate gas stream. The process involves supplying the feed gas stream to a bulk oxygen separation system for removing oxygen to produce an oxygen-depleted crude product gas stream and a first oxygen-containing permeate effluent stream. The oxygen-depleted crude product gas stream is then supplied to a separator including a primary ion transport module having a primary ion transport membrane with a retentate side and a permeate side, to produce a second permeate effluent stream and the oxygen-depleted retentate gas stream. Preferably, a reactive purge gas is then added to react with at least a portion of the oxygen permeating through the primary ion transport membrane and purge the permeate side of the primary ion transport membrane, thereby enhancing the efficiency of the process.

In a preferred embodiment of the invention, the separator further comprises an initial ion transport module membrane having a permeate side and a retentate side to which the oxygen-depleted crude product gas stream is supplied to produce an initial oxygen-depleted retentate gas stream and an initial permeate effluent stream, the initial ion transport membrane connected in series with the primary ion transport membrane such that the initial oxygen-depleted retentate gas stream is supplied to the primary ion transport membrane retentate side. In another preferred embodiment of the invention, at least a portion of at least one of the first oxygen-containing permeate effluent stream from the bulk oxygen separation system and the permeate effluent stream from the primary ion transport membrane is recycled by addition to the feed gas stream. In another preferred embodiment of the invention, the reactive purge gas is in stoichiometric excess to the oxygen permeating through the ion transport membrane and reacts with substantially all of the oxygen therein to produce a purge stream containing combustion products and a portion of unreacted reactive purge gas, the purge waste stream being used to purge the permeate side of the primary ion transport membrane. In yet another preferred embodiment of the invention, the purge stream from the primary ion transport membrane is used to purge the permeate side of the initial ion transport membrane.

The invention also comprises a process for removing oxygen from a feed gas stream using a recycle gas stream comprising at least a portion of at least one gas stream produced during the process, which is recycled by adding the recycle gas stream to at least one gas stream of the process.

The invention further comprises a process for removing oxygen from a feed gas stream containing elemental oxygen and at least one other gas to produce an oxygen-depleted retentate gas stream. The process involves supplying the feed gas stream to a first polymeric membrane stage having a retentate side and a permeate side for removing oxygen to produce a first oxygen-depleted crude product gas stream and a first oxygen-containing permeate effluent stream. The first oxygen-depleted crude product gas stream is then supplied to a second polymeric membrane stage having a retentate side and a permeate side for removing oxygen to produce a second permeate effluent stream and a second oxygen-depleted crude product gas stream, the second polymeric membrane stage connected in series with the first polymeric membrane stage such that the first oxygen-depleted crude product gas stream is supplied to the second polymeric membrane stage retentate side. The second oxygen-depleted crude product gas stream is supplied to a separator including a primary ion transport module having a primary ion transport membrane with a retentate side and a permeate side, to produce a third permeate effluent stream and the oxygen-depleted retentate gas stream. A recycle gas stream comprising at least a portion of at least one gas stream produced during the process is recycled by adding the recycle gas stream to at least one gas stream of the process.

In a preferred embodiment of the invention, the recycle gas stream comprises at least a portion of at least one of the first oxygen-containing permeate effluent stream from the first polymeric membrane stage and the second oxygen-containing permeate effluent stream from the second polymeric membrane stage. In another preferred embodiment of the invention, the separator further comprises an initial ion transport module having an initial ion transport membrane with a permeate side and a retentate side to which the second oxygen-depleted crude product gas stream is supplied to produce an initial oxygen-depleted retentate gas stream and an initial permeate effluent stream, the initial ion transport module connected in series with the primary ion transport module such that the initial oxygen-depleted retentate gas stream is supplied to the primary ion transport membrane retentate side.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

Figure 1:
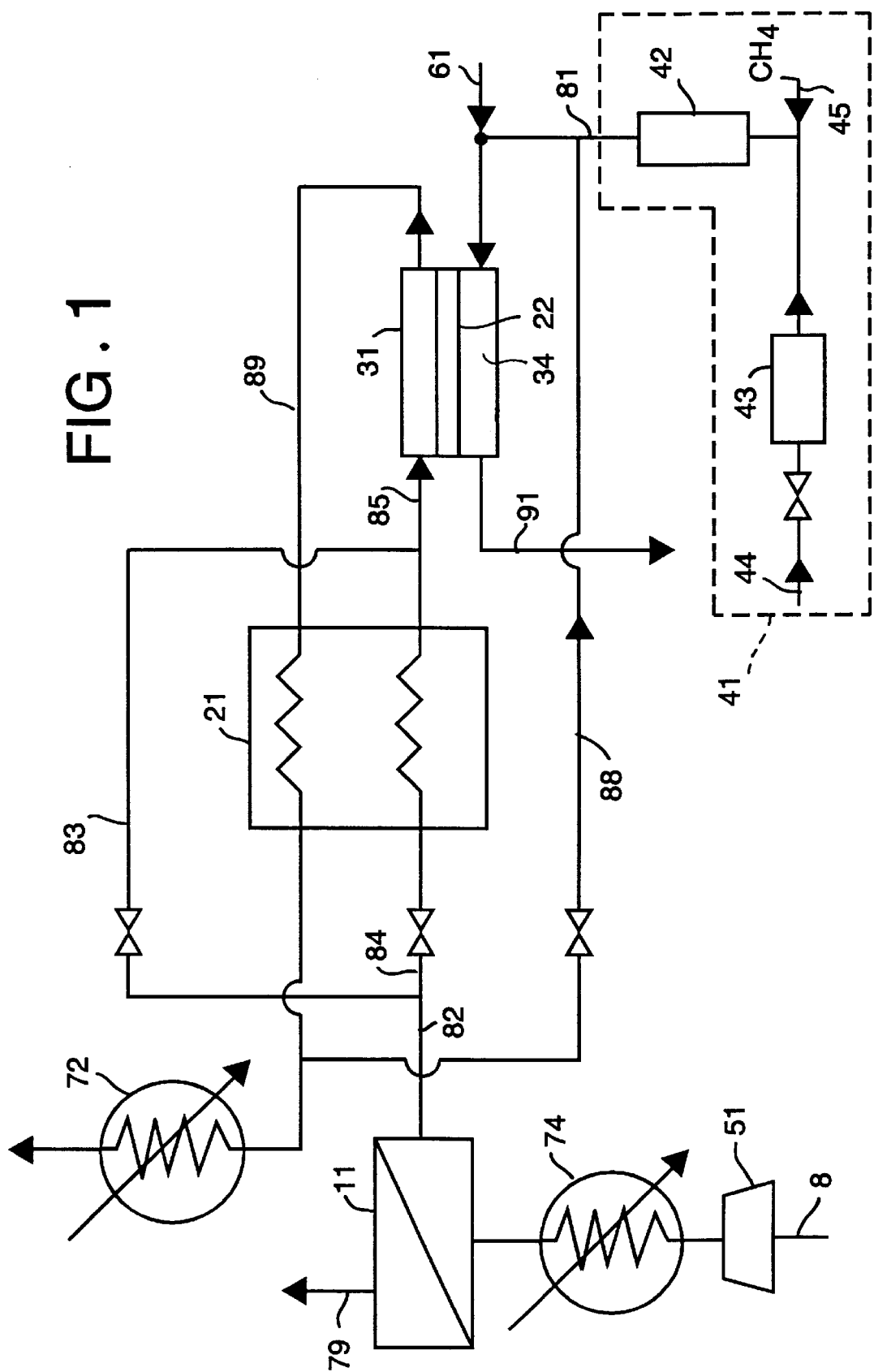
FIG. 1 is a schematic diagram of an embodiment of the invention wherein a low to high purity nitrogen intermediate product gas stream from a bulk oxygen separation system is treated in, a solid electrolyte ion transport module wherein a reactive purge is performed to produce an oxygen-free product.

The invention may be accomplished by employing a solid electrolyte ion transport membrane system, either electrically-driven or pressure-driven, as the separator to remove the residual oxygen from an oxygen-depleted crude product gas stream obtained from a bulk oxygen separation system after processing an initial feed stream. Since the operation of the two types of solid electrolyte ion transport systems is somewhat different, separate descriptions of the bulk oxygen separation system/solid electrolyte ion transport hybrid systems are given below. Preferably at least 50% of the elemental oxygen in the initial feed stream is removed by the bulk oxygen separation system. The gas stream fed to the solid electrolyte ion transport portion of the system would have a preferred range of 88–99% nitrogen (more correctly, oxygen-free gas), that is, 1–12% elemental oxygen; the more preferred range being 93–98% nitrogen, argon or other inert gases (oxygen-free gas), that is, 2–7% elemental oxygen. The solid electrolyte ion transport apparatus is generally operated in excess of 400° C., preferably in the range of 400° C.–1200° C., more preferably in the range of 600° C.–1000° C. Because of the need to maintain these high temperatures, the gas stream fed into the solid electrolyte ion transport apparatus must usually be heated. In this invention, the conventional deoxo system and the associated dryer and hydrogen supply systems of the prior art are eliminated.

High purity nitrogen can be produced efficiently and economically by combining a bulk oxygen separation system, such as a polymeric membrane system, with a solid electrolyte ion transport membrane system. The polymeric membrane system removes the bulk of the oxygen and also removes nearly all of the water vapor and carbon dioxide from the feed gas stream, while the solid electrolyte ion transport membrane system removes the remaining oxygen to make a substantially oxygen-free product, referred to below as a high purity product. Most feed gases processed by bulk oxygen separation systems will have had most of their impurities, such as water vapor and carbon dioxide, removed in the prepurification stage. It should be noted, however, that a supplemental postpurifier may be used to remove any water produced from proton conduction from the anode to the cathode and reaction with oxygen, which is a possibility with some electrolytes and would lead to some low level contamination of the product. Such a supplemental postpurifier could be a polymeric membrane system but is preferably a thermal swing adsorption system which can take advantage of thermal integration with the high temperature solid electrolyte ion transport process.

In this invention, the residual oxygen in the retentate from the polymeric membrane process is removed by an additional "membrane" made from a solid electrolyte ion transport material. Such solid electrolyte ion transport materials can transport oxygen, and only oxygen, by an oxygen ion vacancy mechanism. The separation factor for $O_2/N_2$ is therefore infinite. The residual oxygen is removed without injecting any other impurities into the product stream. There is no need for the hydrogen required by the conventional deoxo process, and there is no need for a dryer to remove water formed by combusting the hydrogen.

Many solid oxides that could serve as solid electrolyte ion transport membranes conduct only oxygen ion vacancies. With such materials, electrodes must be applied to the oxide surfaces and an electric voltage and current must be applied in order to transport oxygen through the membrane. Other oxides have been synthesized that conduct both oxygen ion vacancies and electrons. With these materials, oxygen can be transported through the membrane by the application of an oxygen partial pressure ratio across the membrane without the need for electrodes or electric power. Either of these solid electrolyte ion transport materials can be used, according to this invention, for removing the residual oxygen in the retentate from the polymeric membrane system.

As mentioned above, the terms "solid electrolyte ionic conductor", "solid electrolyte ion transport membrane", "ion transport membrane" or "solid electrolyte" are used to designate either an ionic-type material or a mixed conductor-type material unless otherwise specified.

The term "nitrogen" as used herein will usually mean oxygen-depleted gas, that is, oxygen-depleted relative to the feed gas. As discussed above, the ion transport membrane only allows oxygen permeation. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high purity" refers to a product stream which contains less than two percent by volume of undesired gases. Preferably the product is at least 99.0% pure, more preferably 99.9% pure, and most preferably at least 99.99% pure, where "pure" indicates an absence of undesired gases.

The term "non-cryogenic bulk separation system" refers to any gas separation system which does not utilize a liquid-gas phase change to separate oxygen from one or more other gases, that is, does not utilize distillation, and includes conventional polymeric membrane and adsorption systems.

The terms "pressure-swing adsorption" or "PSA" systems refers to systems using adsorption materials which are selective for a gas, typically nitrogen or oxygen, to separate that gas from other gases. Such materials include rate-selective oxygen-selective PSA materials, which are usually carbon-containing and provide high pressure nitrogen and low pressure oxygen, and equilibrium-selective nitrogen-selective PSA materials, which are typically zeolite molecular sieves and provide low pressure nitrogen and high pressure oxygen. If a PSA system forms part of the bulk separation system, a rate-selective PSA system is particularly suited for pressure-driven ion transport systems because such systems provide high pressure nitrogen and low pressure oxygen, which is a significant advantage because the primary driving force for the ion transport membrane is the pressure of the feed gas. In contrast, rate-selective PSA systems and equilibrium-selective PSA systems work equally well for an electrically-driven ion transport system or any ion transport system with a reactive purge because the pressure of the feed gas is not the primary driving force of such ion transport systems.

The term "waste stream" as used herein designates a gas stream that is typically discarded but may be used as a "purge stream" for purging the membranes and performing other functions. The term "oxygen-containing waste stream" as used herein in relation to an ion transport separator refers to a permeate stream in which some or all of the oxygen emerging from the ion transport membrane may have been consumed. For example, when a reactive purge gas stream is used to purge the permeate (anode) side of the ion transport membrane, the reactive gas reacts with the oxygen permeating through the ion transport membrane on the surface of ion transport membrane. Therefore, with such a reactive purge stream, no bulk oxygen gas stream is formed in the ion transport module nor does an oxygen gas stream exit the ion transport module. If an inert purge stream is used, the permeate gas stream emerging from the ion transport module will be diluted by the inert purge stream. In the absence of a purge stream, the permeate gas stream that carries the oxygen away from the ion transport membrane is pure oxygen, and both the feed or the retentate streams must be at a high pressure (or the permeate stream at a very low pressure) to create a driving force for the oxygen transport. While such an unpurged membrane is attractive for the removal of larger quantities of oxygen from inert gas streams, the oxygen recovery is limited by pressures that can be applied. Even then, the degree of purification that can be obtained is limited.

The term "permeate effluent stream" includes waste streams, oxygen-containing waste streams, and other emissions from a permeate zone which may be used as purge streams according to the present invention.

It should be noted that the gas streams that are described as oxygen-enriched contain a greater percentage of oxygen than the feed gas stream and those described as oxygen-depleted contain a lesser percentage of oxygen than the feed gas stream. Thus, if air (containing 21% oxygen) were the feed gas stream, an oxygen-enriched gas stream would contain more than 21% oxygen. Thus, the term nitrogen-enriched is synonymous with oxygen-depleted and the term nitrogen-depleted is synonymous with the term oxygen-enriched.

The invention will now be described in detail with reference to the figures in which like reference numerals are used to indicate like elements.

An embodiment of the invention is illustrated by the schematic process diagram shown in FIG. 1. In this embodiment, nitrogen intermediate or oxygen-depleted crude product gas stream 82 is generated by bulk oxygen system 11 from feed gas stream 8. Intermediate gas stream 82 is treated in ion transport module 31 wherein a reactive gas purge may be performed to produce high purity retentate gas stream 89 and permeate stream 91. Many of the embodiments of the invention use a reactive purge gas to purge the permeate side of the solid electrolyte ion transport membrane and, in some cases the purge gas may be recycled or, if used in excess, the unreacted reactive purge gas and an oxygen-containing gas stream may be introduced and combusted in a combustor to remove unreacted fuel gas and carbon monoxide before discharge.

During operation, feed gas stream 8 is compressed by compressor 51, cooled by cooler 74, and partially separated by bulk oxygen separation system 11 which produces gas stream 82 and waste stream 79, which is discarded. Gas stream 82 is divided into two gas streams of desired proportions in order to regulate the temperature of feed gas stream 85 such that ion transport module 31 is maintained within a desired temperature range to accommodate the heat generated by reaction of oxygen in permeate zone 34 with reactive gas stream 61. For example, if gas stream 82 contained 5% oxygen by volume, the volume fraction of first gas stream 84 might be 0.3 (that is, about 30% of the volume of gas stream 82) and second gas stream 83 would be 0.7 (that is, about 70% of the volume of gas stream 82) to maintain the temperature of ion transport module 31 at a desired temperature range of 800° C.–1050° C. If, instead, gas stream 82 contained only 2% oxygen by volume, the volume fraction of first gas stream 84 might be 0.7 and the volume fraction of second gas stream 83 would be 0.3. It should be noted that these fractions vary depending on the operating temperature of the ion transport membrane.

First gas stream 84 is heated by product gas stream 89 using heat exchanger 21 while second gas stream 83 is not heated. First gas stream 84 and second gas stream 83 are combined into feed gas stream 85 and introduced into ion transport module 31 wherein mixed conductor ion transport membrane 22 removes oxygen from feed gas stream 85. All or part of the oxygen transported across ion transport membrane 22 reacts with the fuel contained in the reactive purge gas 61 and produces a low oxygen partial pressure at the anode, thereby creating a high oxygen partial pressure ratio across ion transport membrane 22 as a driving force. As a result, high oxygen fluxes can be obtained, membrane areas can be minimized, and very high product purities can be achieved. Product gas stream 89 is cooled, if necessary, to a desired temperature by cooler 72. Product purge gas stream 88 may be withdrawn from product gas stream 89 to purge the permeate side of ion transport membrane 22. In general, the volume fraction of a product gas stream used for such a product purge would be 5–30% by volume or, more preferably, 10–20% by volume.

Because the ion transport system is typically operated at high temperature (approximately 800° C.), starter or ignition system 41 is provided to raise the temperature of ion transport membrane 22 to the desired range. Starter system 41 comprises heater 43 for air stream 44, reactive gas stream 45 (for example, methane), and catalytic monolith 42 which causes the reactive gas and heated air to react and produce hot exhaust gas stream 81 which is used to purge the permeate side of ion transport membrane 22 and thereby heat ion transport membrane 22 to the desired operating temperature. After ion transport membrane 22 reaches the desired operating temperature and the regular purification operation commences, use of starter system 41 is discontinued until needed again. Thereafter the temperature of ion transport membrane 22 is normally maintained in the desired range in the course of operation.

Reactive purge arrangements are disclosed in "Reactive Purge for Solid Electrolyte Membrane Gas Separation", U.S. Ser. No. 08/567,699, filed Dec. 5, 1995 EP Publ. No. 778,069, and incorporated herein by reference. Preferred configurations for ion transport modules utilizing a reactive purge are disclosed in "Solid Electrolyte Ionic Conductor Reactor Design", U.S. Ser. No. 08/848,204 filed Apr. 29, 1997 and also incorporated herein by reference. Both applications are commonly owned with the present application.

Electrically-Driven Ion Transport Membrane Systems

Figure 2:
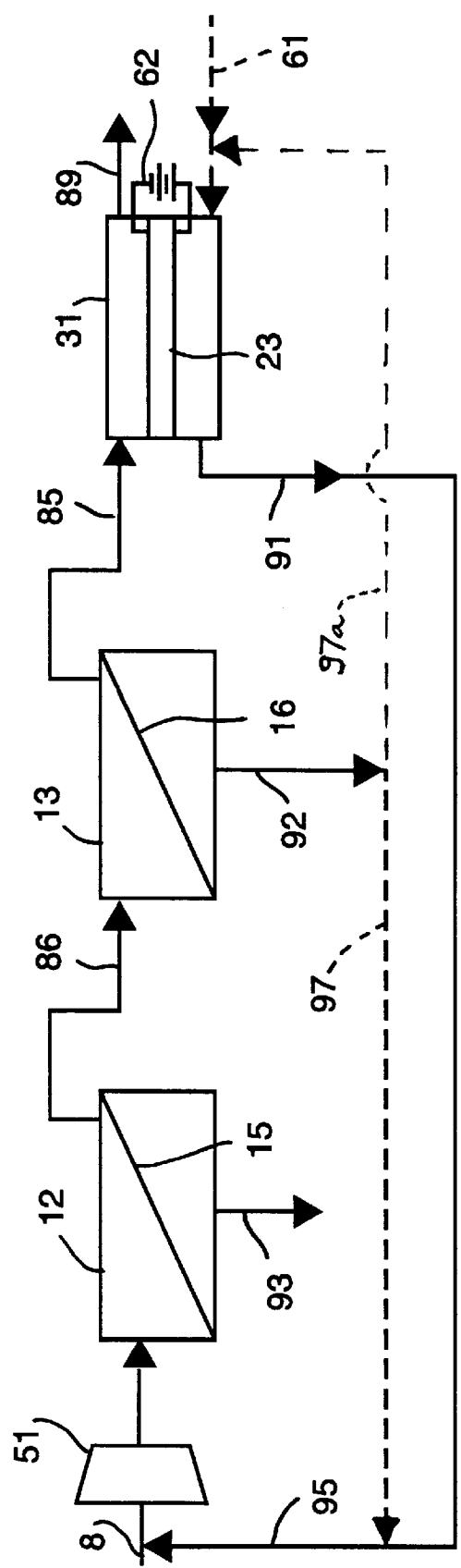
FIG. 2 is a schematic diagram of an embodiment of the invention wherein a two-stage polymeric membrane system produces a medium-high purity nitrogen intermediate product which is then treated in an electrically-driven ion transport membrane module to produce an oxygen-free product.

Another embodiment of the invention is illustrated by the schematic process diagram shown in FIG. 2. For simplicity, this embodiment, unlike FIG. 1, does not show the heaters, coolers, and heat exchange equipment that would be used in the actual operation of the invention.

During operation, feed gas stream 8 is compressed by compressor 51 and is fed into first polymeric membrane stage 12 whose polymeric membrane 15 removes oxygen, water vapor, and carbon dioxide to produce initial oxygen-depleted crude product gas stream 86 and waste stream 93. Initial gas stream 86 is fed into second polymeric membrane stage 13 whose polymeric membrane 16 removes oxygen, water vapor, and carbon dioxide to produce gas stream 85 and permeate effluent waste stream 92. Gas stream 85 is introduced into ion transport module 31 wherein ion transport membrane 23 powered by external power source 62 removes oxygen from feed gas stream 85 to produce high purity nitrogen gas stream 89 and effluent gas stream 91. Effluent gas stream 91 from ion transport module 31 and, optionally, waste stream 92 from second polymeric membrane stage 13 are combined as recycle gas stream 95 and added to feed gas stream 8. Alternatively, or in addition, reactive gas stream 61 may be used to purge the permeate side of ion transport membrane 23. Air, crude product stream 85, or gas stream 91 can also be used to purge the permeate side of ion transport membrane 23.

When a relatively large voltage is applied, the product oxygen partial pressure can be reduced to extremely low values (less than 1 ppb, for example) The required electrical current depends on the oxygen flux, or the rate of removal of the oxygen contained in the retentate. Thus, the electrical power to operate the ion transport process will be proportionally lower as the oxygen content of the intermediate stream is lowered and as the allowable concentration of oxygen in the product is increased. As illustrated in FIG. 2, the power requirement can be reduced by using a purge gas stream or by using reactive gas stream 61 to purge the permeate side of ion transport membrane 23. It should be noted that even if the purge stream for ion transport module 31 contains oxygen, it will usually be less concentrated than pure oxygen and would be effective in reducing the oxygen partial pressure on the permeate side of ion transport membrane 23.

Polymer membranes that are suitable for air separation by the selective permeation of oxygen will also remove water vapor and carbon dioxide. Since the ion transport process introduces no impurities into the nitrogen stream, the product will be of greater purity than the product of a conventional membrane-deoxo hybrid system.

The oxygen concentration in intermediate retentate gas stream 82 from the polymer membrane system is a critical variable in the design and optimization of the overall process. Polymer membrane systems typically can produce nitrogen purities of 90% to 99.5%, depending on the number of membrane stages employed. With a single membrane stage the low purity intermediate product that would be introduced to ion transport module 31 would probably not exceed approximately 99% (that is, approximately 1% oxygen). For the efficient production of high purity nitrogen it is likely that this intermediate concentration should be quite low (approximately 1% or less). Thus it is preferable to use a multiple stage polymeric membrane system. For example, a two stage prepurification system is illustrated in FIG. 2. Nitrogen stream 82 from the polymeric membrane stages will typically contain 0.5% to 3.0% oxygen impurity. Permeate gas stream 92 from second polymeric membrane stage 13 is typically nitrogen-rich compared to air and it is desirable to recycle this gas stream 92 to compressor 51 as recycle gas stream 97. In another embodiment, some or all of permeate effluent stream 92 is directed to purge ion transport membrane 23 as purge stream 97*a*, also shown in phantom. In general, it is desirable to recycle a gas stream through the system when the oxygen concentration of the gas stream is less than that of air, that is, the gas stream contains less than 21% by volume of oxygen. A portion of the second stage permeate can also be used as purge stream 95 for the permeate side of ion transport membrane 23, thereby reducing the voltage and operating power of the module.

In general, electrically-driven ion transport membrane systems will likely be employed if the application is small and where the desired nitrogen purity is high. In such a system, the amount of oxygen in feed gas stream 85 to ion transport module 31 will preferably be less than 2% because of the large amount of electrical power required for oxygen transport across ion transport membrane 23. Utilizing waste stream 92 from second polymeric membrane stage 13 as purge gas stream 95 for ion transport membrane 23 will result in a need to provide an additional recuperative heat exchanger. An alternative option would be to use a portion of the product stream as a purge for ion transport membrane 23, which will similarly lower the partial pressure of oxygen on the permeate side of ion transport membrane 23 and thereby lower the power requirements for ion transport module 31. This alternative would avoid the need for an additional heat exchanger but, by consuming the product gas stream, it would reduce the useful output of the system. It would be worthwhile under either option to recycle purge waste stream 91 from ion transport module 31 back through feed gas stream 8 since its nitrogen content is generally greater than that in the feed gas stream 8, which is usually air.

It is obvious that these principles can be extended to a polymeric membrane/ion transport membrane hybrid process where the polymeric membrane system comprises three (or even more) stages. As explained earlier, it should also be noted that the hybrid systems of the invention generally require heaters, coolers and heat exchange equipment that are not depicted in the embodiments shown in FIGS. 2–6. In the smaller systems that would likely employ electrically-driven ion transport systems such as that depicted in FIG. 2, electric heaters are used to increase the T's for the recuperative heat exchangers and the system benefits from the use of these electrical heaters to enable simple start up of the ion transport membrane system by ramping up the gas feed temperature without additional equipment.

Pressure-Driven Ion Transport Membrane Systems

Complex oxides can be made that exhibit both ionic and electronic conductivity. A membrane of such a mixed conductor can transport oxygen when subjected to a differential partial pressure of oxygen, without the need for an applied electric field. For such materials, the counter-current to the flow of oxygen vacancies is carried by an internal flow of electrons, rather than through an external circuit. No electrodes are required and the entire transport is driven by the partial pressure ratio of the retentate to permeate side gas streams. The internally developed Nernst potential drives the flux of oxygen vacancies against the ionic resistance of the electrolyte.

Figure 3:
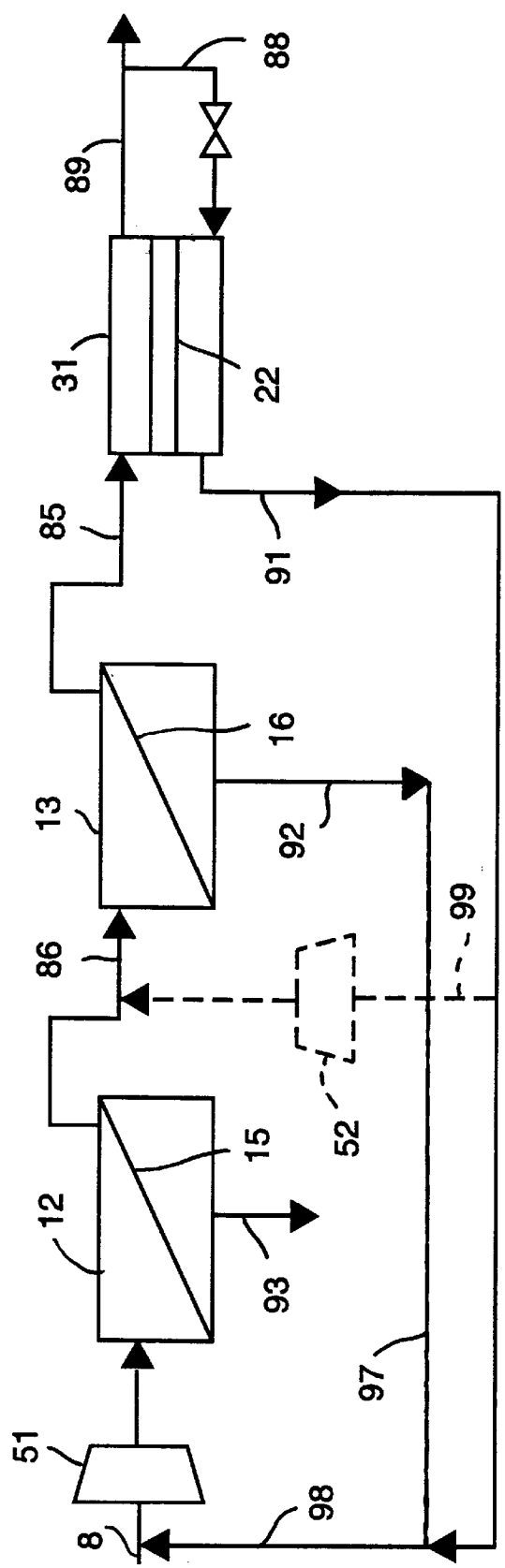
FIG. 3 is a schematic diagram of an embodiment of the invention similar to FIG. 2 using a pressure-driven ion transport membrane module wherein a portion of the high purity product is used for a purge stream for the ion transport membrane.

Another embodiment of the invention is illustrated by the schematic process diagram shown in FIG. 3 which shows how a mixed conductor ion transport membrane can be used in an ion transport module to remove the 0.5–3.0% oxygen in the retentate from a two-stage polymeric membrane system. As in FIG. 2, this embodiment does not show the heaters, coolers, and heat exchange equipment that would be used in the actual operation of the invention.

During operation, feed gas stream 8 is compressed by compressor 51 and is fed into first polymeric membrane stage 12 whose polymeric membrane 15 removes oxygen, water vapor, and carbon dioxide to produce initial gas stream 86 and waste stream 93. Initial gas stream 86 is fed into second polymeric membrane stage 13 whose polymeric membrane 16 removes oxygen, water vapor, and carbon dioxide to produce oxygen-depleted crude product gas stream 85 and waste stream 92. Gas stream 85 is introduced into ion transport module 31 wherein the mixed conductor ion transport membrane 22 removes oxygen from feed gas stream 85 to produce high purity nitrogen gas stream 89 and effluent gas stream 91. Waste stream 92 from second polymeric membrane stage 13 may be used as recycle gas stream 97 and added to feed gas stream 8. Alternatively, or in addition, a portion of high purity nitrogen product stream 89 may be used as product purge gas stream 88 to purge the permeate side of ion transport membrane 22. Effluent gas stream 91 from ion transport module 31 contains both oxygen and nitrogen and can be recycled to compressor 51 together with recycle stream 97 to form combined recycle stream 98 that is added to feed gas stream 8 or, if effluent stream 91 is sufficiently rich in nitrogen, it may be desirable to separately compress some or all of this effluent stream 91 as intermediate recycle stream 99, shown in phantom, using optional compressor 52 and inject it into feed gas stream 86 of second polymeric membrane stage 13.

As was mentioned above, it is generally desirable to recycle a gas stream through the system when the oxygen concentration of the gas stream is less than that of air. In general, a purge using the permeate gas from a polymeric membrane stage would not have a low enough oxygen concentration to work effectively with a pressure-driven ion transport membrane. The volume fraction of a product gas stream used for such a product purge would be 5–30% by volume or, more preferably, 10–20% by volume. The oxygen content on the permeate side of the ion transport membrane must be very low in order to maintain the partial pressure driving force for the oxygen flux through the ion transport membrane.

Pressure-driven systems without a reactive purge rely primarily upon purging with a portion of the high purity product to produce the driving force for oxygen transport. The amount of purge gas that is required would depend on the pressure ratio across the ion transport membrane. Such pressure-driven systems would probably not be employed where ultrahigh purity nitrogen (less than 5 ppm oxygen) is desired. The exiting purge stream from the permeate side of the ion transport membrane can be fed to the compressor suction to improve the nitrogen recovery in the polymeric membrane system. With a single stage ion transport membrane system it is likely that the system feed will be limited to oxygen concentrations of less than 2% to 5%. With the employment of a second ion transport stage, the oxygen concentration of the system feed can be increased. For all pressure-driven ion transport systems without reactive purge, external heat must be added at the high temperature end to maintain reasonable UA's in the recuperative heat exchangers.

In contrast, a pressure-driven system with a reactive purge employs a reactive purge gas to react with the permeating oxygen to create a very low oxygen partial pressure at the permeate side of the ion transport membrane and therefore a very high driving force for oxygen transport and the ability to achieve very low oxygen concentrations in the retentate product gas. The best product economics will likely be achieved with a bulk oxygen separation system which produces a nitrogen product containing 4% to 7% oxygen that is fed into the ion transport deoxo system which removes the remaining oxygen to a concentration of less than 5 ppm in the high purity nitrogen product stream. The purge stream from the ion transport system can be recycled to the suction of the compressor for the feed gas since the purge stream would then contain little or no oxygen. In such a case, the bulk oxygen separation system will have to remove additional carbon dioxide and water vapor from the reaction products in the gas stream.

Figure 4:
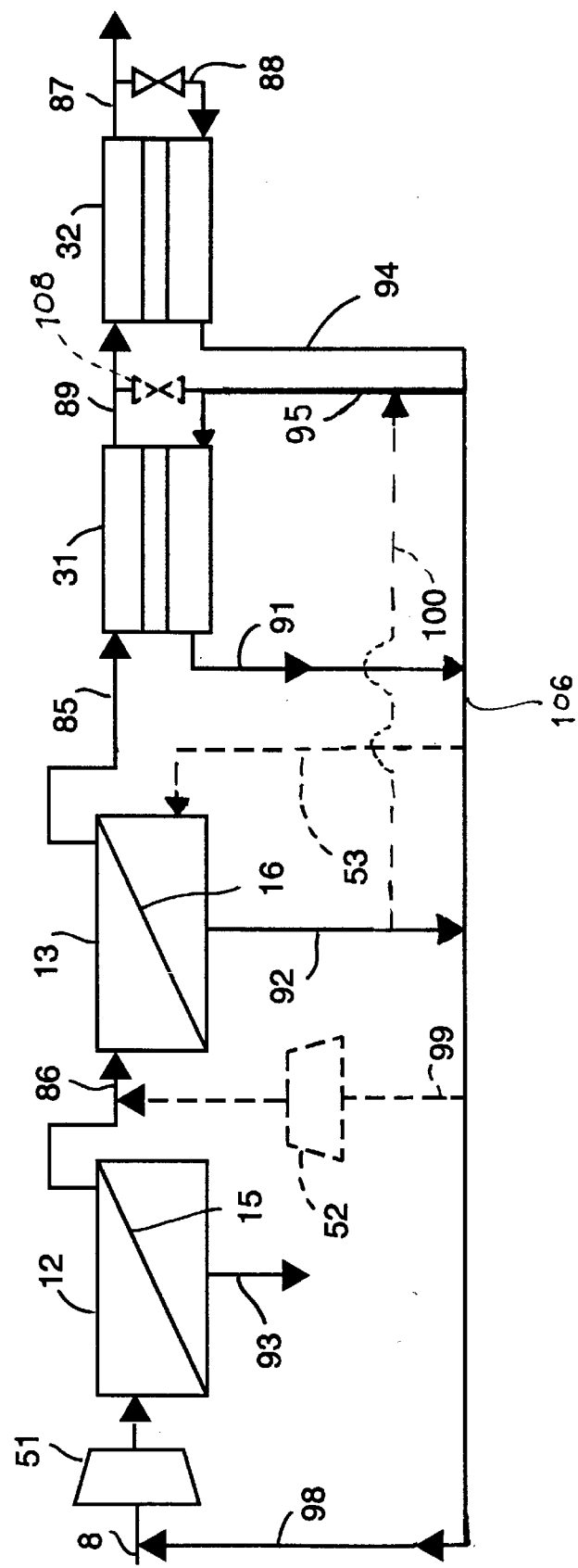
FIG. 4 is a schematic diagram of an embodiment of the invention having a two-stage polymeric membrane system and a two-stage solid electrolyte ion transport module system wherein the final solid electrolyte ion transport module stage employs a product purge and the permeate gas stream from the second polymeric membrane stage is used to purge the first solid electrolyte ion transport module stage.

FIG. 4 illustrates a hybrid process comprising a two-stage polymeric membrane system and a two-stage ion transport system. In this example, final ion transport stage 32 employs product purge gas stream 88, and at least a portion of permeate gas stream 92 from second polymeric membrane stage 13 preferably is directed as gas stream 100, shown in phantom, to purge first ion transport stage 31 as gas stream 95. Purge effluent gas stream 94 from final ion transport stage 32 can be recycled to compressor 51 as recycle gas stream 98 which is formed successively from streams 94 and 106 in this embodiment. Alternatively, at least a portion of stream 98 can be compressed by optional compressor 52 and be injected into inter-stage feed stream 86 as gas stream 99 or at least a portion of stream 106 can be used to purge second polymeric membrane 16 as gas stream 53, depending on the oxygen concentration.

During operation, feed gas stream 8 is compressed by compressor 51 and is fed into first polymeric membrane stage 12 whose polymeric membrane 15 removes oxygen, water vapor, and carbon dioxide to produce initial gas stream 86 and waste stream 93. Initial gas stream 86 is fed into second polymeric membrane stage 13 whose polymeric membrane 16 removes oxygen, water vapor, and carbon dioxide to produce oxygen-depleted crude product gas stream 85 and oxygen-containing permeate effluent stream 92.

Gas stream 85 is introduced into first ion transport module 31 to remove oxygen from gas stream 85 to produce high purity nitrogen gas stream 89 and permeate effluent gas stream 91. Optionally, a portion of gas stream 89 may be directed through a valve 108, shown in phantom, and used to purge the permeate side of the ion transport membrane of first ion transport module 31, with purge stream 95 in this embodiment. High purity nitrogen gas stream 89 is then introduced into second ion transport module 32 to further remove oxygen from high purity nitrogen gas stream 89 to produce high purity nitrogen gas stream 87, which preferably is passed through a heat exchanger and recovered as the product, and permeate effluent gas stream 94. A portion of high purity nitrogen gas stream 87 is used as product purge gas stream 88 to purge the permeate side of second ion transport module 32 and form effluent gas stream 94. Optional gas stream 100, comprising some or all of permeate effluent stream 92, may be added to effluent gas stream 94 to form gas stream 95.

Gas stream 95, to which optional gas stream 100 may be joined, is used as a purge gas stream to purge the permeate side of first ion transport module 31 and form permeate effluent gas stream 91. Effluent gas stream 91 may be combined with gas stream 94 to make gas stream 106. Gas stream 106 optionally may be used to purge second polymeric membrane 16 as gas stream 53. Gas stream 106 is combined with waste stream 92 to make gas stream 98, which is added to feed gas stream 8 and recycled to compressor 51 or, optionally, may be directed as gas stream 99 to be compressed by optional compressor 52 and injected into inter-stage feed stream 86, depending on the oxygen concentration. Purge effluent stream 94 can also be used to purge second polymeric membrane stage 13 without combining with effluent stream 91.

The oxygen content of the high purity nitrogen product from the ion transport stage(s) can be very low, ranging from 10 ppm to less than 1 ppb.

Figure 5:
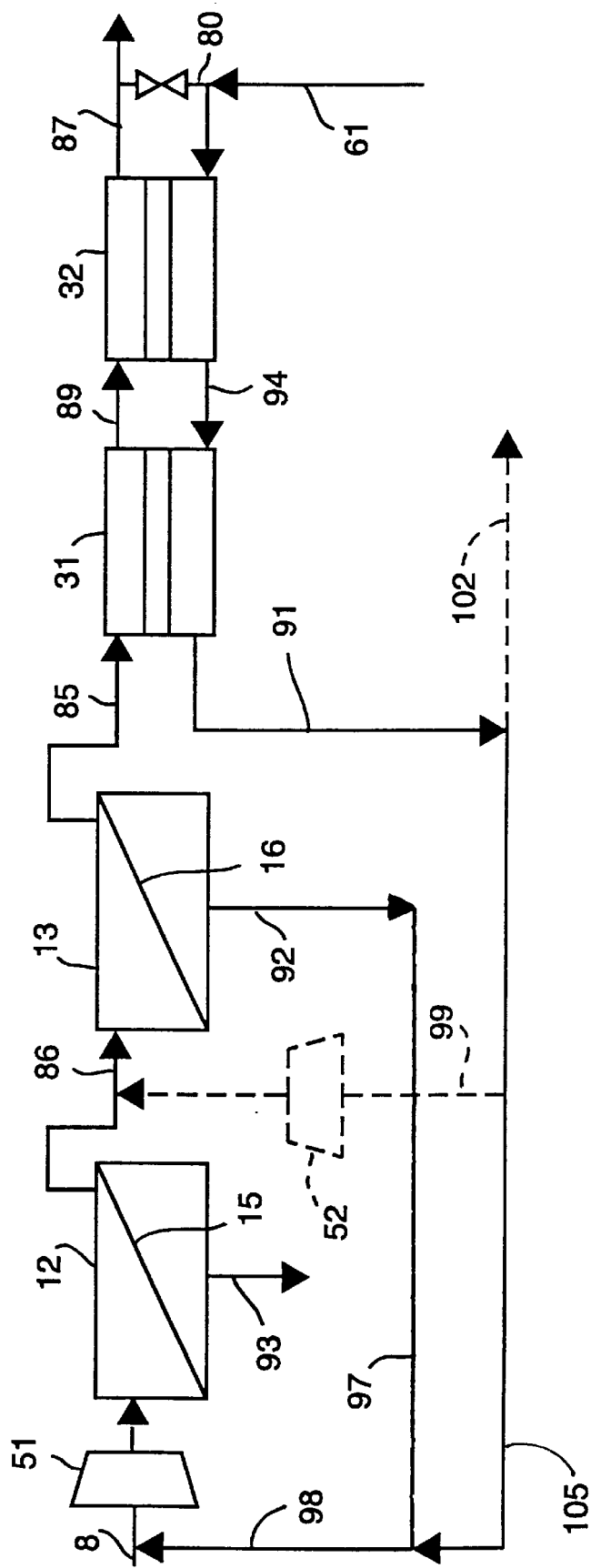
FIG. 5 is a schematic diagram of an embodiment of the invention similar to FIG. 4, wherein a reactive purge is performed in the last solid electrolyte ion transport module stage and the exhaust gases are used to purge the first solid electrolyte ion transport module stage.

The membrane/ion transport hybrid processes that have been described require no hydrogen or other additional gases. If an economical source of fuel such as methane is available, a different mode of operation utilizing a reactive purge is preferred. One form of this reactive purge process is illustrated in FIG. 5. Fuel gas stream 61 can be used to purge the permeate side of the ion transport membrane of ion transport module 32. Fuel gas stream 61 will react with the oxygen permeating through the ion transport membrane of ion transport module 32, thereby reducing the oxygen partial pressure to an extremely low value. This maintains the driving force for the oxygen flux across the ion transport membrane of ion transport module 32. In this embodiment of the invention, the amount of fuel used in the purge stream is less than that required to react with all of the oxygen to be removed (an equivalence ratio less than 1.0). In FIG. 5, all of the fuel is burned in final ion transport module 32. Exhaust gas stream 94 is then used to purge first ion transport stage module 31 and FIG. 5 depicts these two ion transport module stages 32 and 31 as separate units. It is apparent, however, that these same operations could be carried out in a single ion transport stage. Final purge effluent stream 91 contains some oxygen and all of the combustion products. It is desirable to recycle this effluent stream 91 as stream 105 to stream 98 to compressor 51 and then to the polymer membrane system or as stream 99 to optional compressor 52 and then to intermediate stage feed stream 86. In either case, the polymer membrane system can efficiently remove the water vapor and carbon dioxide, thus rejecting these combustion products from the nitrogen stream. In yet another embodiment, permeate gas stream 91 is directed as waste stream 102, shown in phantom, and thermal energy may be captured therefrom.

Since the combustion process is exothermic, the excess heat can be useful in elevating the temperature of the ion transport system, which must usually operate above 600° C. Much of this heat is produced in the last ion transport stage of FIG. 5 and the temperature rise could become excessive unless the feed gas stream is introduced at a sufficiently low temperature to act as a heat sink.

Other streams are generated and directed as described elsewhere in this application. For example, a portion of crude product stream 85 can be directed to purge the permeate side of membrane 16 and then be recycled via streams 92, 97 and 98 to rejoin feed stream 8.

Figure 6:
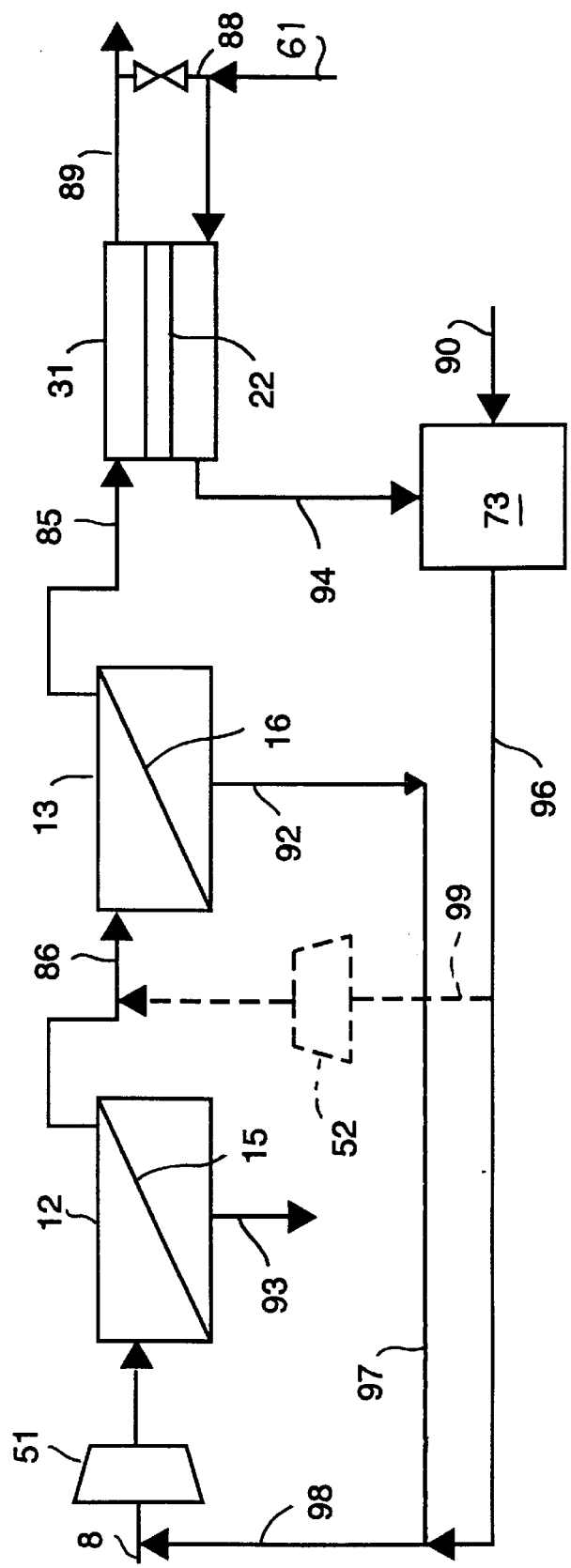
FIG. 6 is a schematic diagram of an embodiment of the invention similar to FIG. 5, wherein the reactive purge contains an excess of fuel so that the purge effluent stream will contain little oxygen but will include some fuel and the products of combustion which is then reacted with an oxygen-containing gas in a combustor.

Another way of using a reactive purge is illustrated in FIG. 6. In this case, an excess of fuel is employed (an equivalence ratio greater than 1.0). Purge effluent gas stream 94 will contain little oxygen but will include some fuel and the products of combustion, such as carbon monoxide, carbon dioxide, hydrogen, water vapor and methane. This effluent gas stream 94 is then reacted with air stream 90 (or other oxygen-containing gas) in combustor 73. The heat released during the combustion can be used for a number of purposes, including preheating the feed gas to the ion transport process, steam generation for yielding additional "inert" purge gas or for heating the high pressure, high purity nitrogen prior to expansion through a turbine to produce power. As before, combusted effluent gas stream 96, after cooling, would be recycled to the polymeric membrane system, wherein the combustion products would be removed from the nitrogen retentate stream.

Figure 7:
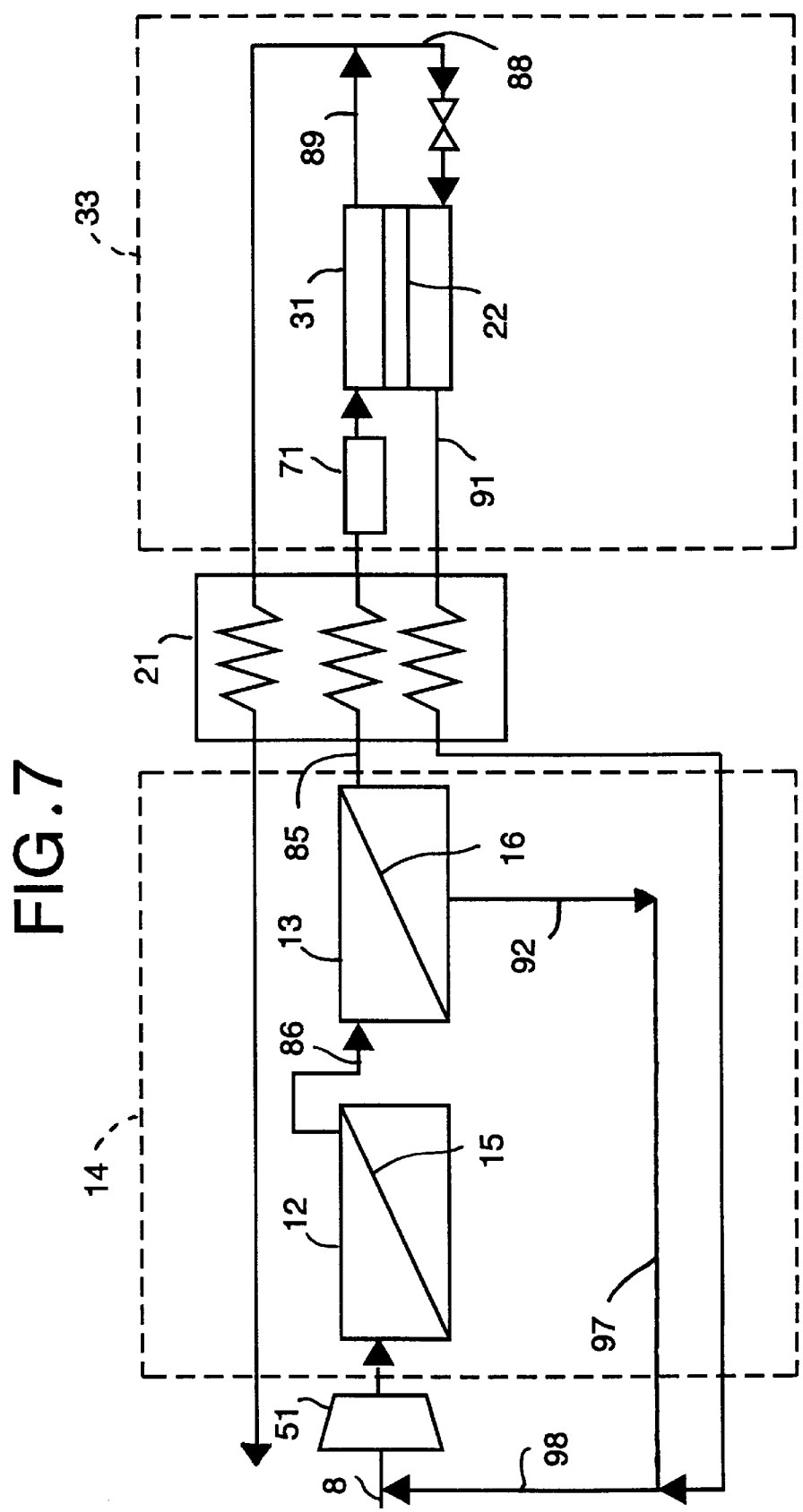
FIG. 7 is a schematic diagram of an embodiment of the invention similar to FIG. 3 but showing how the ambient temperature region of the polymer membrane separation system can be coupled by a heat exchanger with the high temperature region of the solid electrolyte ion transport module.

Since the polymeric membrane process and the ion transport process operate at widely different temperatures, many additional physical elements such as inter-system and inter-stage heat exchangers, inter-coolers, heaters, etc. are required in the practice of the invention that are not shown in FIGS. 2–6. FIG. 7 is a schematic diagram, however, of an embodiment of the invention similar to FIG. 3 but showing how ambient temperature region 14 of the polymer membrane separation system can be coupled by heat exchanger 21 with high temperature region 33 of ion transport module 31. In addition, heater 71 is provided to raise the temperature of feed gas stream 85 entering ion transport module 31. Among other advantages apparent in this embodiment, heat exchanger 21 enhances the energy efficiency of the overall process. Such components and their operation are well known in the art and in the practice of gas separation and gas processing and their appropriate use in the present invention would be understood to those of skill in the art.

Figure 8:
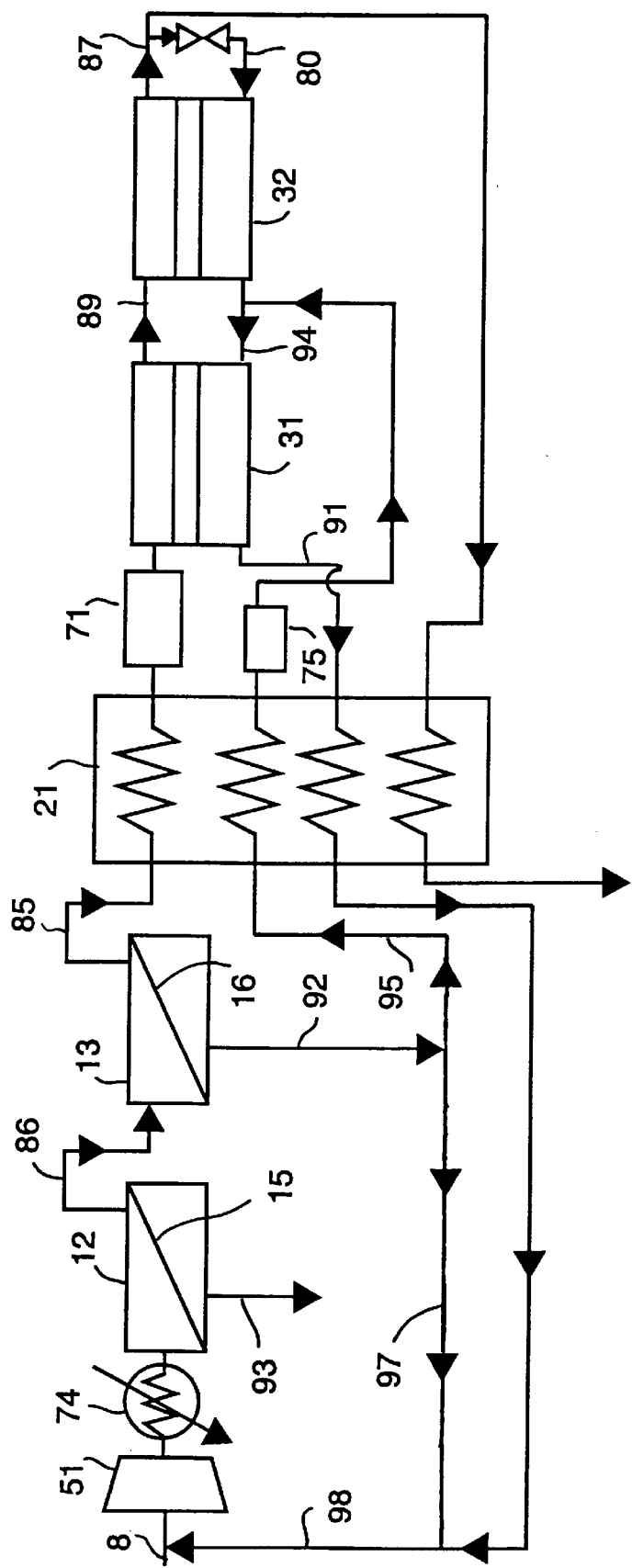
FIG. 8 is a schematic diagram of an embodiment of the invention similar to FIG. 4 but showing how the ambient temperature region of the polymer membrane separation system can be coupled by a heat exchanger with the high temperature region of the solid electrolyte ion transport module.

Yet another embodiment of the invention is illustrated by the schematic process diagram shown in FIG. 8. This embodiment shows the heaters, coolers, and heat exchange equipment that might be used in the actual operation of the invention.

During operation, feed gas stream 8 is compressed by compressor 51, cooled by cooler 74, and is fed into first polymeric membrane stage 12 whose polymeric membrane 15 removes oxygen, water vapor, and carbon dioxide to produce initial oxygen-depleted crude product gas stream 86 and waste stream 93. Initial oxygen-depleted gas stream 86 is fed into second polymeric membrane stage 13 whose polymeric membrane 16 removes oxygen, water vapor, and carbon dioxide to produce oxygen-depleted crude product gas stream 85 and waste stream 92. Waste stream 92 is divided into gas stream 95 and gas stream 97. Gas stream 95 is passed through heat exchanger 21 and heater 75 and added to the effluent gas stream from second ion transport module 32 to form gas stream 94. Gas stream 85 is passed through heat exchanger 21 and heater 71 and is introduced into first ion transport module 31 to remove oxygen from gas stream 85 to produce high purity nitrogen gas stream 89 and effluent gas stream 91. High purity nitrogen gas stream 89 is then introduced into second ion transport module 32 to further remove oxygen from high purity nitrogen gas stream 89 to produce high purity nitrogen gas stream 87, which is passed through heat exchanger 21 and recovered as the product, and effluent gas stream 94. A portion of high purity nitrogen gas stream 87 is used as product purge gas stream 80 to purge the permeate side of second ion transport module 32 and form effluent gas stream 94. Effluent gas stream 94 is used as a purge gas stream to purge the permeate side of first ion transport module 31 and form effluent gas stream 91 which is passed through heat exchanger 21 and combined with gas stream 97 to form gas stream 98 which is added to feed gas stream 8.

Figure 9:
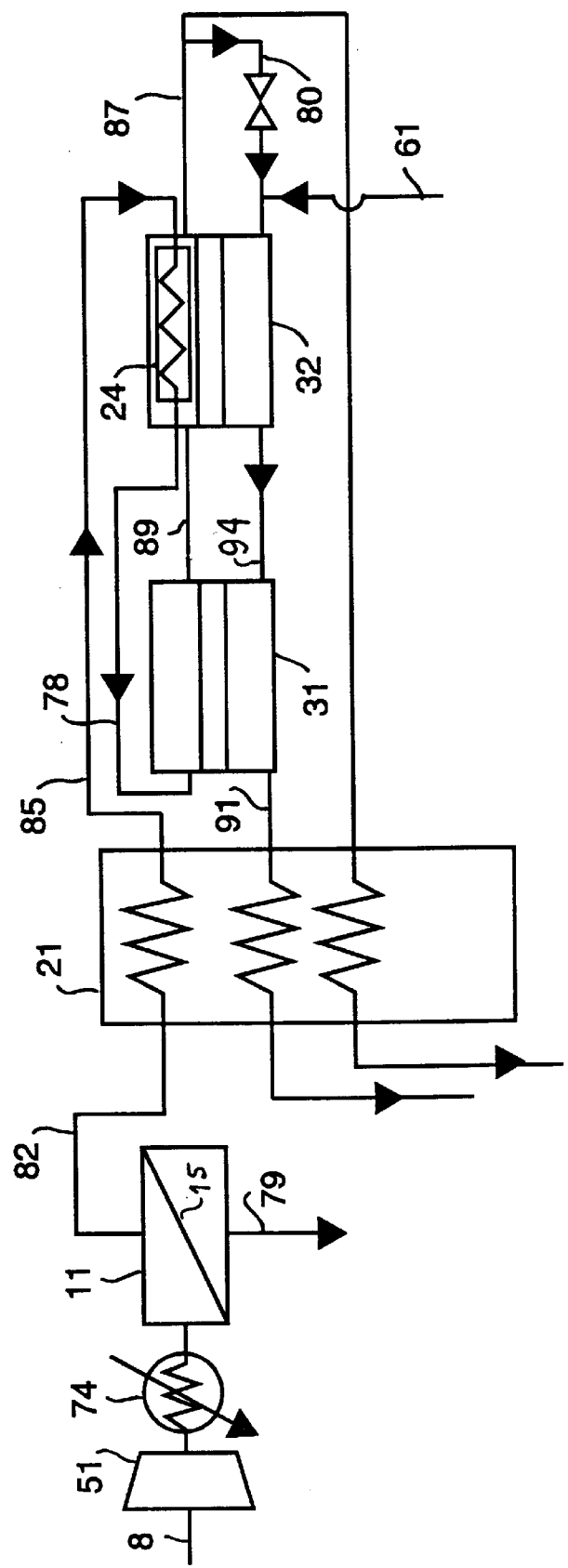
FIG. 9 is a schematic diagram of an embodiment of the invention showing heat exchange elements and having a two-stage solid electrolyte ion transport module system wherein the gas stream from the bulk oxygen separation system is first passed through an internal heat exchanger within the second solid electrolyte ion transport module before being purified by the first solid electrolyte ion transport module stage and the second solid electrolyte ion transport module stage.

Another embodiment of the invention is illustrated by the schematic process diagram shown in FIG. 9. This embodiment shows the coolers and heat exchange equipment that are used in one implementation of the invention.

During operation, feed gas stream 8 is compressed by compressor 51, cooled by cooler 74, and is fed into first polymeric membrane stage 11 whose polymeric membrane 15 removes oxygen, water vapor, and carbon dioxide to produce initial oxygen-depleted crude product gas stream 82 and waste stream 79. Gas stream 82 is passed through heat exchanger 21 to provide warmed gas stream 85 which is passed through heat exchanger 24 within second ion transport module 32 to form gas stream 78. Heat exchanger 24 utilizes the heat capacity of ion transport module feed stream 78 to absorb the heat of reaction without excessive temperature rise. Gas stream 78 is introduced into first ion transport module 31 to remove oxygen from gas stream 85 to produce high purity nitrogen gas stream 89 and effluent waste stream 91. High purity nitrogen gas stream 89 is then introduced into second ion transport module 32 to further remove oxygen from high purity nitrogen gas stream 89 to produce high purity nitrogen gas stream 87, which is passed through heat exchanger 21 and recovered as the product, and effluent gas stream 94. A portion of high purity nitrogen gas stream 87 is used as a diluent to reactive purge gas stream 80 to purge the permeate side of second ion transport module 32 and form effluent gas stream 94. This effluent gas stream 94 from second ion transport module 32 is used as a purge gas stream to purge the permeate side of the ion transport membrane of first ion transport module 31 and form effluent gas stream 91 which is passed through heat exchanger 21. Reactive gas stream 61 is used to purge the permeate side of the ion transport membrane of second ion transport module 32.

Figure 10:
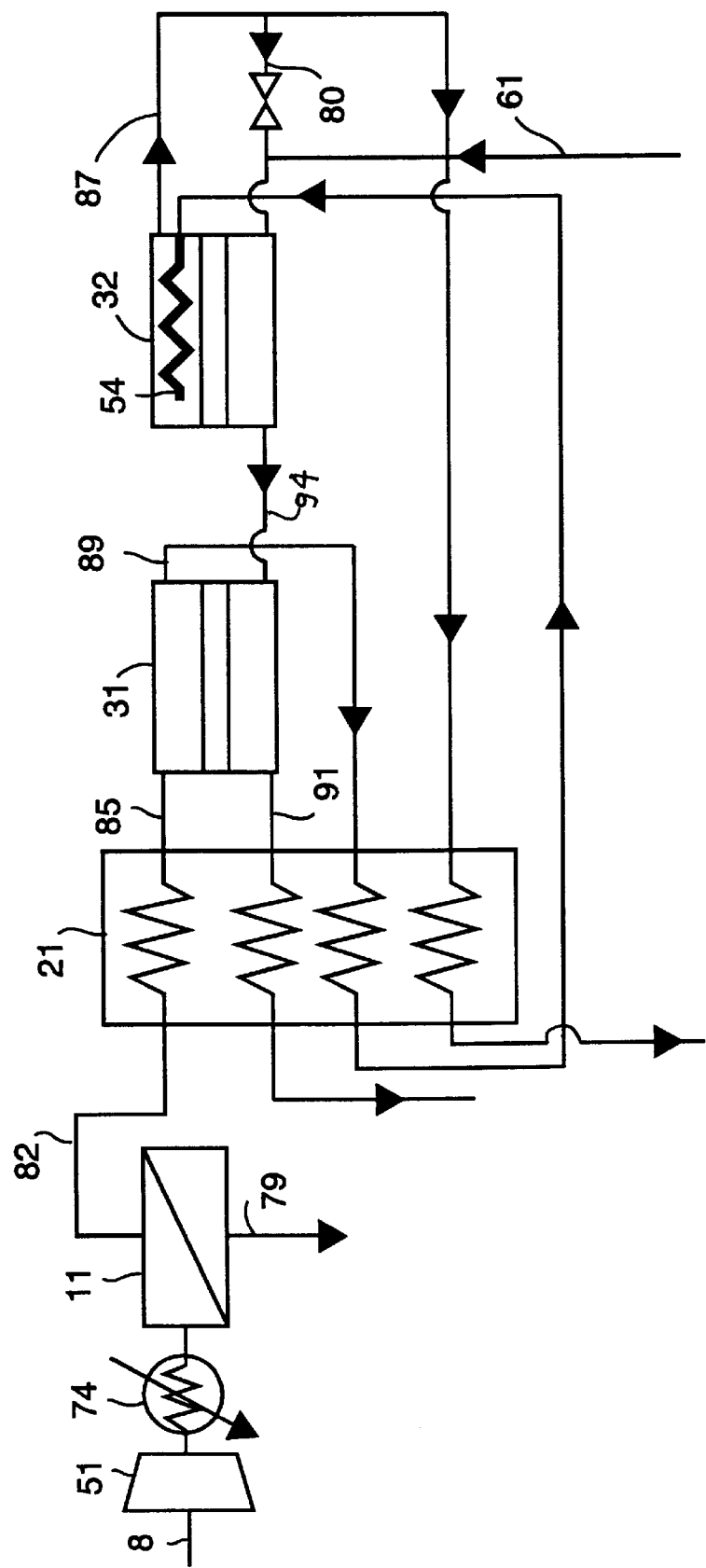
FIG. 10 is a schematic diagram of an embodiment of the invention showing heat exchange elements and having a two-stage solid electrolyte ion transport module system wherein the gas stream from the bulk oxygen separation system is first purified by the first solid electrolyte ion transport module stage and is then introduced to the second solid electrolyte ion transport module stage by a novel reactor design element for further purification.

A different embodiment of the invention is illustrated by the schematic process diagram shown in FIG. 10. This embodiment shows the coolers and heat exchange equipment that might be used in the actual operation of the invention.

During operation, feed gas stream 8 is compressed by compressor 51, cooled by cooler 74, and is fed into bulk oxygen separation system 11 to produce initial oxygen-depleted crude product gas stream 82 and waste stream 79. Initial oxygen-depleted gas stream 82 is passed through heat exchanger 21 to provide warmed gas stream 85 which is introduced into first ion transport module 31 to remove oxygen from gas stream 85 to produce high purity nitrogen gas stream 89 and effluent gas stream 91. High purity nitrogen gas stream 89 is passed through heat exchanger 21 and introduced into second ion transport module 32 by internal reactor design 54 or other heat transfer means to further remove oxygen from high purity nitrogen gas stream 89 to produce high purity nitrogen gas stream 87, which is passed through heat exchanger 21 and recovered as the product, and effluent gas stream 94.

Internal reactor design 54 with heat transfer means is the subject of copending U.S. patent application Ser. No. 08/848,204, by Prasad et al., entitled *Solid Electrolyte Ionic Conductor Reactor Design*, which was filed on Apr. 29, 1997, and is hereby incorporated by reference to more fully describe and illustrate the claimed invention. This internal reactor design 54 utilizes an ion transport membrane to heat the gas stream fed into it and thus prepares the gas stream for second ion transport module 32 to remove any residual oxygen.

A portion of high purity nitrogen gas stream 87 is used as product purge gas stream 80 to purge the permeate side of the ion transport membrane of second ion transport module 32 and form effluent gas stream 94. This effluent gas stream 94 from second ion transport module 32 is used as a purge gas stream to purge the permeate side of the ion transport membrane of first ion transport module 31 and form effluent gas stream 91 which is passed through heat exchanger 21. Reactive gas stream 61 combined or diluted by gas stream 80 is used to purge the permeate side of the ion transport membrane of second ion transport module 32 and produces effluent gas stream 94. The temperature of high purity nitrogen gas stream 89 leaving heat exchanger 21 is controlled to make sure that the gas stream has sufficient heat capacity to absorb the heat of reaction generated in second ion transport module 32, thereby limiting the temperature rise of the ion transport membrane.

Figure 11:
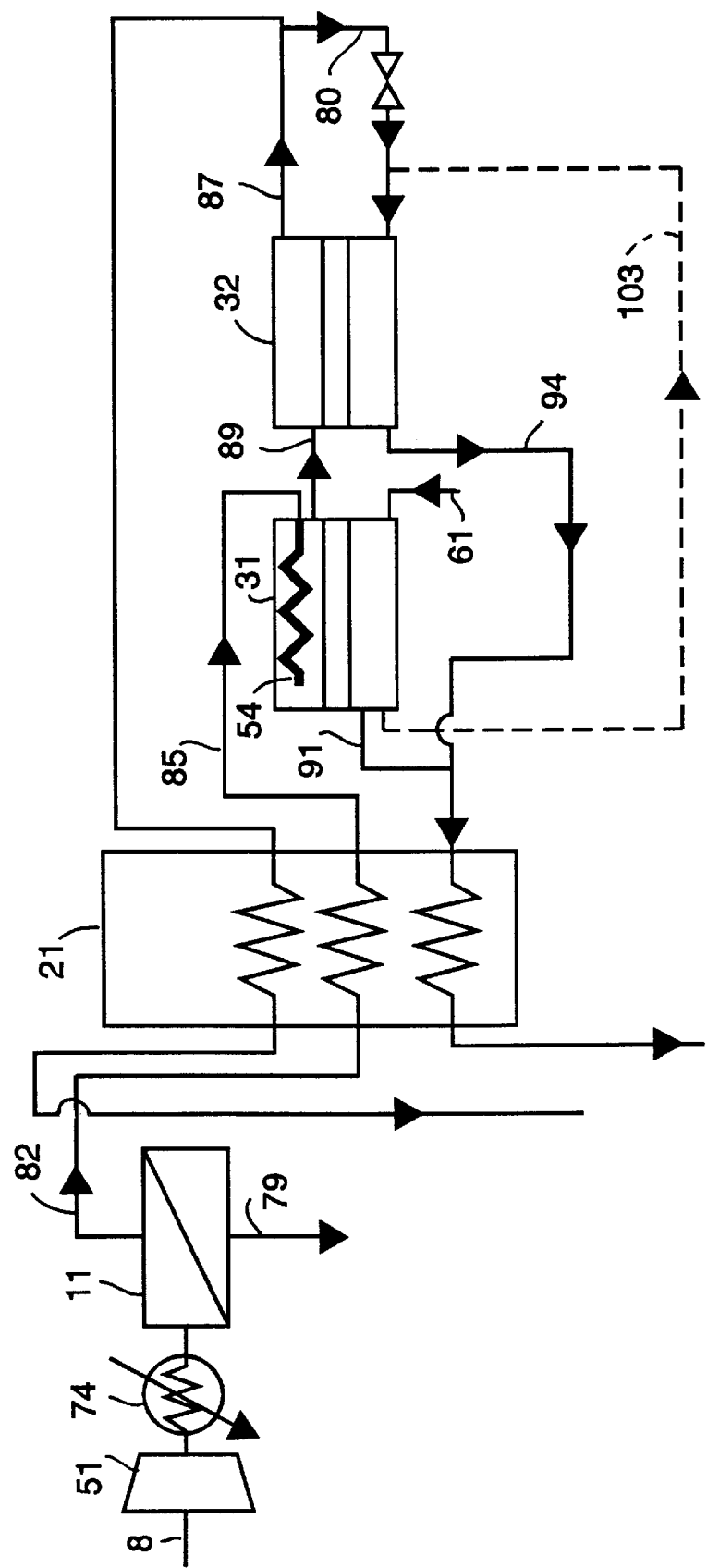
FIG. 11 is a schematic diagram of an embodiment of the invention showing heat exchange elements and having a two-stage ion transport module system wherein the gas stream from the bulk oxygen separation system is first introduced to the first ion transport module stage by a novel reactor design element and is further purified by the second ion transport module stage.

Another embodiment of the invention is illustrated by the schematic process diagram shown in FIG. 11. This embodiment shows the coolers and heat exchange equipment that optionally are used in the actual operation of the invention. In this arrangement first ion transport module 31 removes most of the contained oxygen using a reactive purge and also provides the necessary energy to elevate feed gas stream 85 to ion transport membrane operating temperature. Second ion transport module 32 removes the residual oxygen using a product and combustion product purge gas stream 103. The advantages are: (1) that first ion transport module 31 can operate as a combustor heater with a relatively simple piping arrangement and (2) that the arrangement avoids excessively low partial oxygen pressures at the anode of either ion transport membrane. Very low partial oxygen pressures at the anode can be generated in case of a reducing environment at the anode and a low partial oxygen pressure at the cathode and can lead to reductions in the life of the solid electrolyte membrane material. If the residual oxygen that has to be removed in second ion transport module 32 is kept small, cost penalties due to the extra area in second ion transport module 32 because of a low partial oxygen pressure driving force can be minimized. The option of using the products of reaction as purge gas stream 103 from first ion transport module 31 to purge the permeate side of the ion transport membrane of second ion transport module 32 would reduce the need for product purge and, therefore, lead to higher nitrogen recovery. It is important that all the oxygen in purge gas stream 103 will have been consumed before the stream is introduced to second ion transport module 32. Practically, this requires that the reaction in first ion transport module 31 must be run fuel-rich, detracting from the aforementioned lessened material wear.

During operation, feed gas stream 8 is compressed by compressor 51, cooled by cooler 74, and is fed into bulk oxygen separation system 11 to produce initial gas stream 82 and waste stream 79. Gas stream 82 is passed through heat exchanger 21 to provide warmed gas stream 85 which is introduced into first ion transport module 31 with internal reactor design 54 or other heat transfer means to remove oxygen from gas stream 85 to produce high purity nitrogen gas stream 89 and effluent gas stream 91. As mentioned above regarding FIG. 10, internal reactor design 54 is the subject of copending U.S. patent application Ser. No. 08/848,204, which was previously incorporated by reference. High purity nitrogen gas stream 89 is then introduced into second ion transport module 32 to further remove oxygen from high purity nitrogen gas stream 89 to produce high purity nitrogen gas stream 87, which is passed through heat exchanger 21 and recovered as the product, and effluent gas stream 94. A portion of high purity nitrogen gas stream 87 is used as product purge gas stream 80 to purge the permeate side of the ion transport membrane of second ion transport module 32 and form effluent gas stream 94 which is passed through heat exchanger 21. Reactive gas stream 61 is used to purge the permeate side of the ion transport membrane of first ion transport module 31 and combine with effluent gas stream 91 which is passed through heat exchanger 21. Another possibility would be to use effluent gas stream 103 to purge the permeate side of the ion transport membrane of second ion transport module 32 and combine with effluent gas stream 94 which is passed through heat exchanger 21.

Specific features of the invention are shown in one or more of the drawings for convenience only, as each feature may be combined with other features in accordance with the invention. In addition, various changes and modifications may be made to the examples given without departing from the spirit of the invention. Such modifications may include the use of pressure-swing and thermal-swing adsorption beds or other methods of bulk oxygen separation to provide the function of the polymeric membranes discussed above. Alternative embodiments will be recognized by those skilled in the art and they are intended to be included within the scope of the claims.

What is claimed is:

1. A process for removing oxygen from a feed gas stream containing elemental oxygen and at least one other gas to produce an oxygen-depleted retentate gas stream, the process comprising:

supplying the feed gas stream to a bulk oxygen separation system for removing oxygen to produce an oxygen-depleted crude product gas stream and a first permeate effluent stream;

supplying the oxygen-depleted crude product gas stream to a separator including a primary ion transport module having a primary ion transport membrane with a retentate side and a permeate side, to produce a second permeate effluent stream and the oxygen-depleted retentate gas stream; and adding a reactive purge gas to react with a portion of the oxygen permeating through the primary ion transport membrane and purge the permeate side of the primary ion transport membrane, thereby enhancing the efficiency of the process.

2. The process according to claim 1, wherein the separator further comprises an initial ion transport module having an initial ion transport membrane, the initial ion transport membrane having a permeate side and a retentate side to which the oxygen-depleted crude product gas stream is supplied to produce an initial oxygen-depleted retentate gas stream and an initial permeate effluent stream, the initial ion transport membrane connected in series with the primary ion transport membrane such that the initial oxygen-depleted retentate gas stream is supplied to the primary ion transport membrane retentate side.

3. The process according to claim 2 wherein the second permeate effluent stream from the primary ion transport membrane is used to purge the permeate side of the initial ion transport membrane.

4. The process according to claim 1, wherein at least a portion of at least one of the first permeate effluent stream from the bulk oxygen separation system and the second permeate effluent stream from the primary ion transport membrane is recycled by addition to the feed gas stream.

5. The process according to claim 1, wherein the reactive purge gas is in stoichiometric excess to the oxygen permeating through the ion transport membrane and reacts with substantially all of the oxygen therein to produce a purge permeate effluent stream containing combustion products and a portion of unreacted reactive purge gas.

6. The process according to claim 5, wherein at least a portion of the purge permeate effluent stream and an oxygen-containing gas stream are introduced into a combustor and combusted therein to generate heat energy.

7. A process for removing oxygen from a feed gas stream containing elemental oxygen and at least one other gas to produce an oxygen-depleted retentate gas stream, the process comprising:

supplying the feed gas stream to a non-cryogenic bulk oxygen separation system for removing oxygen to produce an oxygen-depleted crude product gas stream and a first oxygen-containing permeate effluent stream;

supplying the oxygen-depleted crude product gas stream to a separator including a primary ion transport module having a primary ion transport membrane with a retentate side and a permeate side, to produce a second permeate effluent stream and the oxygen-depleted retentate gas stream; and recycling a recycle gas stream comprising at least a portion of at least one gas stream produced during the process, by adding the recycle gas stream to at least one gas stream of the process.

8. The process according to claim 7, wherein the separator further comprises an initial ion transport module membrane, the initial ion transport membrane having a permeate side and a retentate side to which the oxygen-depleted crude product gas stream is supplied to produce an initial oxygen-depleted retentate gas stream and an initial permeate effluent stream, the initial ion transport membrane connected in series with the primary ion transport membrane such that the initial oxygen-depleted retentate gas stream is supplied to the primary ion transport membrane retentate side.

9. The process according to claim 7, wherein the primary ion transport membrane is an electrically-driven ion transport membrane and at least a portion of the first oxygen-containing permeate effluent stream from the non-cryogenic bulk oxygen separation system is used to purge the permeate side of the primary ion transport membrane.

10. The process according to claim 9, wherein the recycle gas stream comprises the purge stream from the primary ion transport membrane and is recycled by addition to the feed gas stream.

11. The process according to claim 7, wherein a reactive purge gas is used to react with a portion of oxygen permeating through the primary ion transport membrane and purge the permeate side of the primary ion transport membrane to produce a purge stream, the purge stream being used to purge the permeate side of the initial ion transport membrane.

12. The process according to claim 7, wherein the reactive purge gas is in stoichiometric excess to the oxygen permeating through the ion transport membrane and reacts with substantially all of the oxygen therein to produce a purge stream containing combustion products and a portion of unreacted reactive purge gas.

13. The process according to claim 12, wherein at least a portion of the purge stream and an oxygen-containing gas stream are introduced into a combustor and combusted therein to generate heat energy.

14. A process for removing oxygen from a feed gas stream containing elemental oxygen and at least one other gas to produce an oxygen-depleted retentate gas, the process comprising:

supplying the feed gas stream to a first polymeric membrane stage having a retentate side and a permeate side for removing oxygen to produce a first oxygen-depleted crude product gas stream and a first oxygen-containing permeate effluent stream;

supplying the first oxygen-depleted crude product gas stream to a second polymeric membrane stage having a retentate side and a permeate side for removing oxygen to produce a second oxygen-containing permeate effluent stream and a second oxygen-depleted crude product gas stream, the second polymeric membrane stage connected in series with the first polymeric membrane stage such that the first oxygen-depleted crude product gas stream is supplied to the second polymeric membrane stage retentate side;

supplying the second oxygen-depleted crude product gas stream to a separator including a primary ion transport module having a primary ion transport membrane with a retentate side and a permeate side, to produce a third permeate effluent stream and the oxygen-depleted retentate gas stream; and recycling a recycle gas stream comprising at least a portion of at least one gas stream produced during the process, by adding the recycle gas stream to at least one gas stream of the process.

15. The process according to claim 14, wherein the primary ion transport membrane is an electrically-driven membrane and the recycle gas stream comprises at least a portion of at least one of the first oxygen-containing permeate effluent stream from the first polymeric membrane stage and the second permeate effluent stream from the second polymeric membrane stage.

16. The process according to claim 15, wherein at least a portion of at least one of the first oxygen-containing permeate effluent stream from the first polymeric membrane stage and the second oxygen-containing permeate effluent stream from the second polymeric membrane stage is used to purge the permeate side of the primary ion transport membrane.

17. The process according to claim 15, wherein the separator further comprises an initial ion transport module having an initial ion transport membrane with a permeate side and a retentate side to which the second oxygen-depleted crude product gas stream is supplied to produce an initial oxygen-depleted retentate gas stream and an initial permeate effluent stream, the initial ion transport module connected in series with the primary ion transport module such that the initial oxygen-depleted retentate gas stream is supplied to the primary ion transport membrane retentate side.

18. The process according to claim 17, wherein the recycle gas stream comprises at least a portion of at least one of the first oxygen-containing permeate effluent stream from the first polymeric membrane stage, the second oxygen-containing permeate effluent stream from the second polymeric membrane stage, the initial oxygen-containing permeate effluent stream from the initial ion transport membrane, and the third permeate effluent stream from the primary ion transport membrane.

19. The process according to claim 17, wherein at least a portion of the oxygen-depleted retentate gas stream is used to purge the permeate side of the primary ion transport membrane, and at least a portion of the purge stream from the primary ion transport membrane is recycled by addition to the first oxygen-depleted crude product gas stream from the first polymeric membrane stage.

20. The process according to claim 14, wherein a reactive purge gas is used to react with a portion of the oxygen permeating through the membrane and purge the permeate side of the primary ion transport membrane to produce a purge permeate effluent stream, the purge stream being used to purge the permeate side of the initial ion transport membrane.

* * * * *